US012664579B2

(12) United States Patent
Maharaj et al.

(10) Patent No.: US 12,664,579 B2
(45) Date of Patent: Jun. 23, 2026

(54) SELECTIVELY DISPLAYING VIDEOS BY AN ONLINE SYSTEM

(71) Applicant: Maplebear Inc., San Francisco, CA (US)

(72) Inventors: Shaun Navin Maharaj, Vaughan (CA); Brent Scheibelhut, Toronto (CA); Mark Oberemk, Toronto (CA); Madeline Mesard, New York, NY (US); Mengfei Gu, Woodland Hills, CA (US)

(73) Assignee: Maplebear Inc., San Francisco, CA (US)

( * ) Notice: Subject to any disclaimer, the term of this patent is extended or adjusted under 35 U.S.C. 154(b) by 45 days.

(21) Appl. No.: 18/780,146

(22) Filed: Jul. 22, 2024

(65) Prior Publication Data

US 2026/0024125 A1     Jan. 22, 2026

(51) Int. Cl.
*G06Q 30/06*        (2023.01)
*G06Q 30/0601*      (2023.01)

(52) U.S. Cl.
CPC ..... *G06Q 30/0631* (2013.01); *G06Q 30/0603* (2013.01)

(58) Field of Classification Search
CPC ...................... G06Q 30/0631; G06Q 30/0603
USPC ........................................................ 705/26.7
See application file for complete search history.

(56) References Cited

U.S. PATENT DOCUMENTS

| | | | | | |
|---|---|---|---|---|---|
| 9,786,027 | B1 * | 10/2017 | Cooley | .................. | H04L 67/10 |
| 2011/0194619 | A1 * | 8/2011 | Yu | ......................... | H04N 19/30 |
| | | | | | 375/240.26 |

| | | | | | |
|---|---|---|---|---|---|
| 2013/0097309 | A1 * | 4/2013 | Ma | ......................... | H04L 67/02 |
| | | | | | 709/224 |
| 2014/0379490 | A1 * | 12/2014 | Schnabl | ............. | G06Q 30/0244 |
| | | | | | 705/14.71 |
| 2018/0005500 | A1 * | 1/2018 | Robertson | .......... | G06Q 10/1091 |

FOREIGN PATENT DOCUMENTS

| | | | | | |
|---|---|---|---|---|---|
| KR | 20140086970 | A | * | 7/2017 | ............. G06Q 30/02 |

OTHER PUBLICATIONS

B V Patel and B B Meshram; " Content Based Video Retrieval Systems"; published in International Journal of UbiComp (IJU), vol. 3, No. 2, Apr. 2012; retrieved from IP/ Com on Oct. 30, 2025 (Year: 2012).*

* cited by examiner

*Primary Examiner* — Yogesh C Garg

(74) *Attorney, Agent, or Firm* — Fenwick & West LLP

(57)                ABSTRACT

An online concierge system selectively replaces default static item displays with dynamic item displays to represent items. The dynamic item displays encourage a viewing user of the online concierge system to purchase the items and may be selected based on item or user preferences or characteristics. The online concierge system applies a machine learning model to determine display scores describing the expected benefit of dynamic item displays and bandwidth scores describing resource usage of dynamic item displays. The online concierge system selectively replaces default static item displays with dynamic item displays based on the display and bandwidth scores so as to maximize benefit while ensuring that performance of the online concierge system is not negatively impacted by the resource usage.

20 Claims, 6 Drawing Sheets

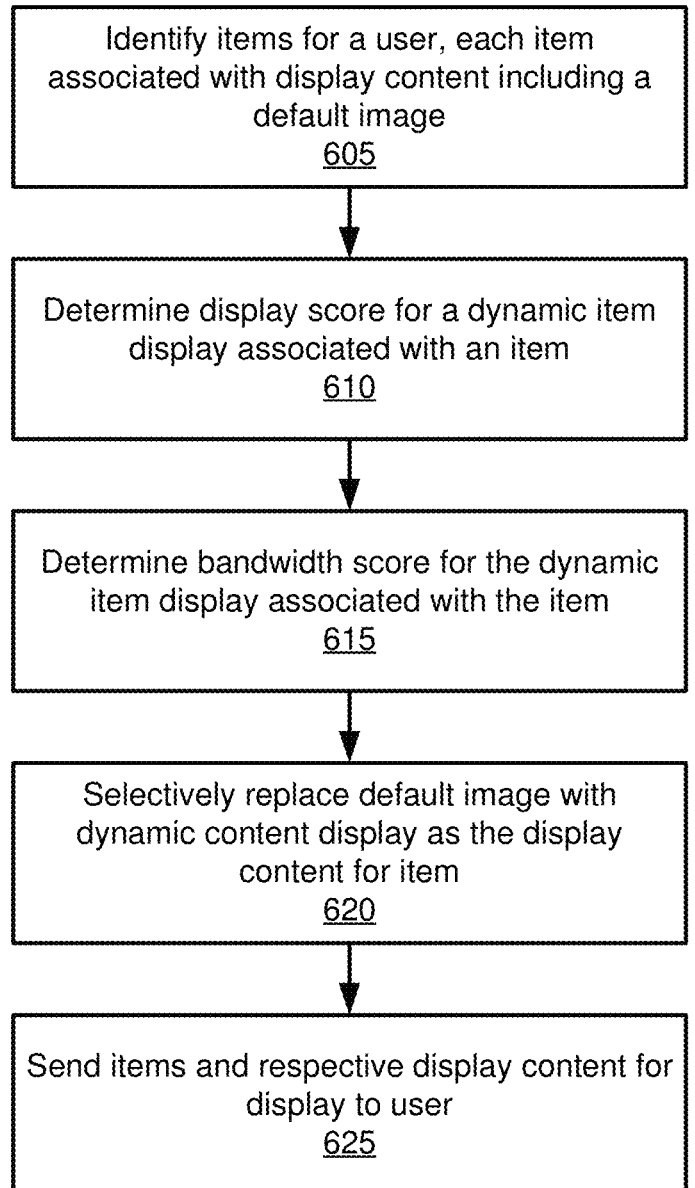

Identify items for a user, each item associated with display content including a default image
605

Determine display score for a dynamic item display associated with an item
610

Determine bandwidth score for the dynamic item display associated with the item
615

Selectively replace default image with dynamic content display as the display content for item
620

Send items and respective display content for display to user
625

FIG. 6

SELECTIVELY DISPLAYING VIDEOS BY AN ONLINE SYSTEM

BACKGROUND

This disclosure relates generally to displaying items on an online system, and more specifically to displaying videos about items from an online catalog to selectively lift users' interactions with items in the online system.

To place an order through an online system, such as an online concierge system, a user navigates items offered by a warehouse to identify items to include in the order. Similarly, a user may provide a search query to the online concierge system to look for items to include in an order. Items included in the user interface are often represented by static images showing the item, which do not provide context for the use of the item. As such, users that are viewing items may overlook or not consider items that they are unfamiliar with or do not know how to use, resulting in fewer sales on the online concierge system.

SUMMARY

In accordance with one or more aspects of the disclosure, an online concierge system generates a personalized user interface to show items for purchase and delivery to users, wherein images may be replaced with more dynamic representations of items to encourage users to purchase the items. Dynamic displays, such as videos, can be more useful to users in evaluating items to select, and as such, are more likely to lead to users purchasing the associated items. Dynamic displays may be informative, such as videos demonstrating how to use or prepare an item, may include promotional material by content creators, or may be otherwise personalized to a user of the online concierge system.

Because videos and other dynamic content require more bandwidth (or other resources) than static images, dynamic item displays can impact performance of the user interface resulting in delayed loading or slow performance of the user's device. In addition, user interfaces with multiple videos may impact user navigation on the online concierge system. To ensure that the user interface runs smoothly, the online concierge system selectively replaces default static images with dynamic content such that resource usage by the dynamic content does not negatively affect performance of the display of items available on the online concierge system.

In one or more embodiments, the online concierge system uses a trained machine learning model to determine a display score and a bandwidth score for each video. The display score describes a performance benefit (e.g., a lift or boost) caused by the video relative to the default image associated with the item. The bandwidth score describes resource usage of the video. Based on the display and bandwidth scores for videos, the online concierge system selects a video to replace the default image such that the lift for the item is maximized within an acceptable threshold of bandwidth usage.

BRIEF DESCRIPTION OF THE DRAWINGS

FIG. 6 is a flowchart for a method for selecting dynamic item displays to replace static item displays in a user interface, in accordance with one or more embodiments.

DETAILED DESCRIPTION

Figure 1:
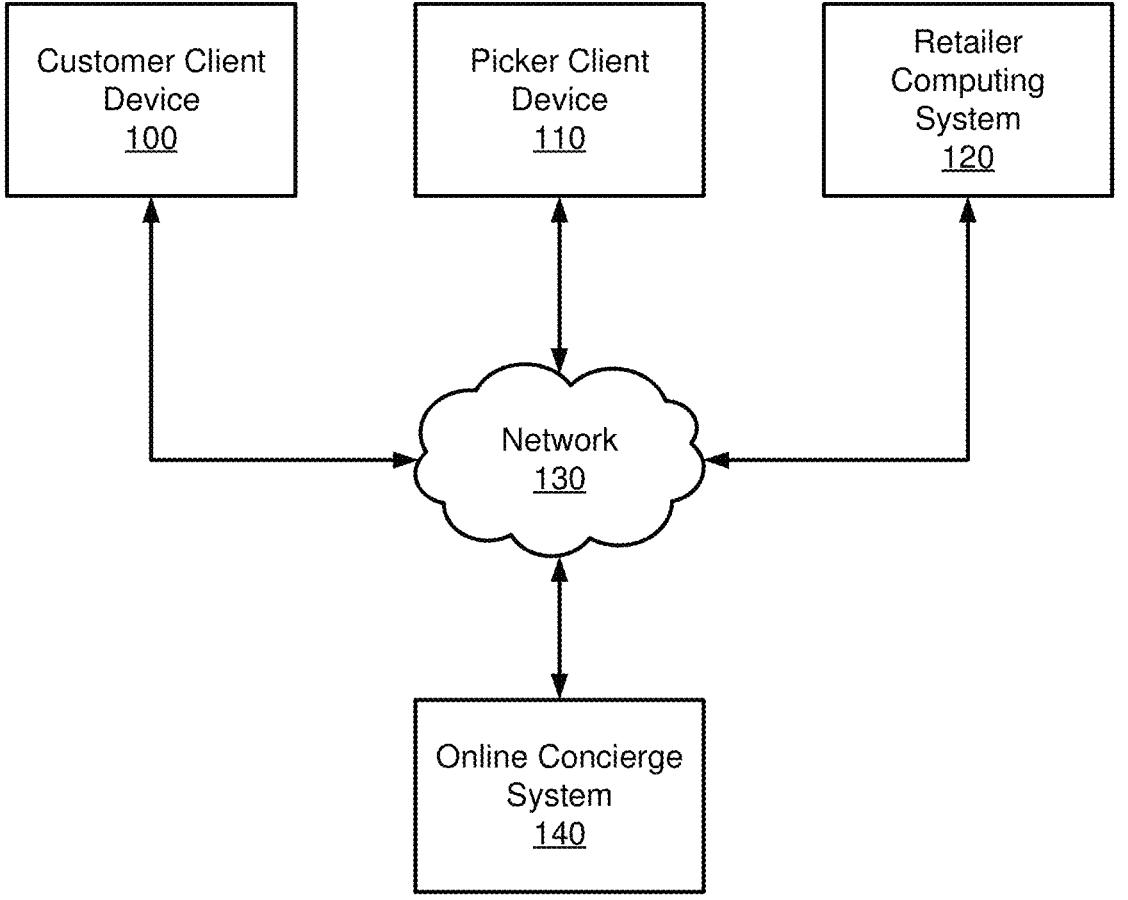
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
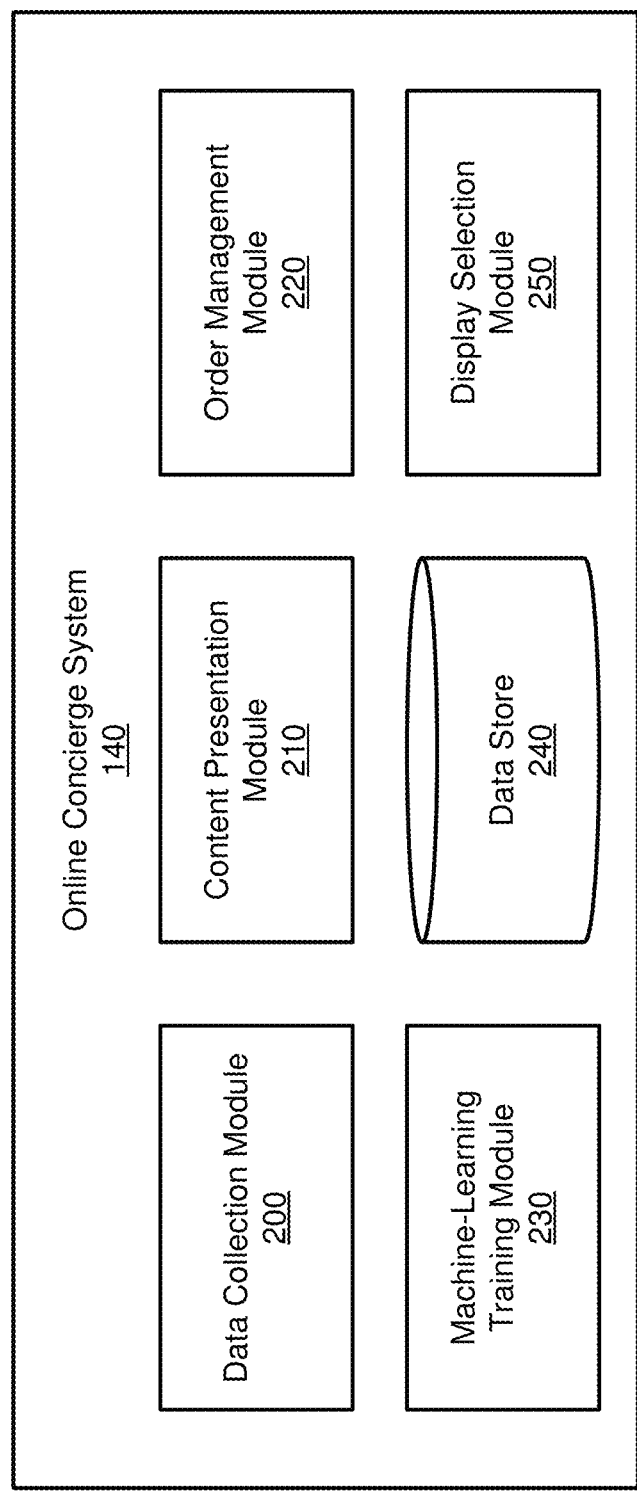
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and a display selection module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. A machine-learning model may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the set of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data, and may use databases to organize the stored data.

The display selection module 250 selects display content for presentation to users of the online concierge system 140. Display content on the online concierge system 140 provides users with a visual representation of items offered for inclusion in orders. As users navigate the online concierge system, display content may appear in various interfaces of the online concierge system 140, such as in item carousels, search results, sidebars, headers, and so forth. As discussed further below, the particular content used to represent a given item may vary from user to user and from time to time, such that the content representing an item may be selected for a particular user based on various factors as discussed below.

Often, items of the online concierge system 140 are associated with a default display content. The default display content may be the "standard" used for an item that may be replaced by another display content under certain conditions. The default display content is often a static item display, e.g., an image file that shows the associated item. Because the default display content may be provided to most users, the default display content is typically a straightforward representation of the associated item such as a picture of the item packaging (e.g., the default display content for a container of ice cream may be an image file showing the ice cream in a bowl and/or in the container).

The display selection module 250 determines whether it is beneficial to replace the default display content for an item with another display content, particularly a dynamic item display. That is, in many cases dynamic content (e.g., video and/or audio content that changes over time) may be more effective at displaying an item or promoting features of the item to a user, but may also present costs to transmit and display the content to users. In addition, excess dynamic content may negatively affect the user experience. The display selection module 250 additionally may determine when and where in a user's browsing activity to replace the default display content for a dynamic item display, e.g., on a homepage of the online concierge system 140, on a search results page, or the like. The dynamic item display may be any content including a "dynamic" aspect that changes over time, such as a video or audio component. For example, the dynamic item display may be a video showing an item being prepared for a meal with audio instructions, or may be a short video with no audio component showing the item being used.

However, dynamic item displays typically require additional resources compared to static item displays. Dynamic item displays may consume more bandwidth, CPU/GPU, and/or memory resources, and may additionally include other computing resources by the online concierge system 140, networking components, or computing resources of a user device. For example, using dynamic item displays requires loading the dynamic item displays in memory and displaying the dynamic item displays to a user in an interface of the online concierge system 140, e.g., buffering the dynamic item display or otherwise storing the dynamic item display for when the user browses or scrolls to the item in the interface.

Because of the additional resource requirement, the online concierge system 140 may be unable to fully replace default static item displays with dynamic item displays without causing delay in user interfaces or otherwise impacting performance of the online concierge system. Further, dynamic item displays may be more impactful (e.g., visually or otherwise) than static item displays, and as such, may be visually overwhelming to users if used in excess. As such, the display selection module 250 selectively replaces default static item displays with dynamic item displays to prevent negatively impacting user experience on the online concierge system 140.

To determine whether to replace the static image, the display selection module 250 evaluates an expected benefit, including a "lift," of displaying the dynamic item display to a user of the online concierge system 140, and the resource requirements for displaying the dynamic item display. The expected lift for the dynamic item display may be measured by an expected difference in user interaction when presented with the dynamic item display relative to the default display. For example, the expected lift may represent an increased likelihood of the user interacting with the item and/or an increased likelihood of the user adding the item to a cart for purchase.

Expected lift for a dynamic item display may differ based on characteristics of the dynamic item display, as well as based on characteristics of a user viewing the dynamic item display. Dynamic item displays may, for example, include different types of information about an associated item, may be catered towards different user demographics, etc. Different types and characteristics of dynamic item displays are discussed further in conjunction with FIG. 4.

In some embodiments, the display selection module 250 applies a computer trained model to determine expected lift for a dynamic item display. The machine learning model may be trained using training data describing the user and dynamic item displays to predict the lift of the dynamic item display. The machine learning model may use various characteristics of the user, the item, and the dynamic item display for predicting the lift for the dynamic item display. Additionally, the machine learning model may use various characteristics of other users of the online concierge system 140, geographic trends or patterns associated with one or more of the user, the item, the dynamic item display, or the like.

In some embodiments, the machine learning model may evaluate relative popularity of items (e.g., under-utilization of items or commonly ordered items) in a user's geographic area as a feature. For example, certain dynamic content may include educational or other content highlighting the benefits (or how to utilize such benefits) of an item. When an item is under-utilized in a geographic region, it may indicate that users within that area are less aware of the item's potential benefit. Thus, under-utilized items may receive a greater lift from dynamic item displays including a recipe suggestion for the item (or otherwise receive a higher beneficial score), while commonly ordered items may receive a lesser lift due to users in the geographic area already choosing to purchase the item. In other embodiments, the machine learning model may evaluate content types or content creators associated with a user, e.g., based on user interactions, user demographics, or the like, as a feature, such that dynamic item displays promoted by content creators with whom the user has previously interacted or liked may receive a greater lift for the user.

The machine learning model may be trained by the display selection module 250. In other embodiments, the machine learning model may be trained by one or more third-party systems or servers, such as by a retailer system. The display selection module 250 may use a single machine learning model for all retailers and/or warehouses of the online concierge system 140. Alternatively, machine learning models may be associated with particular retailers or warehouses, a particular location or instance of a retailer or warehouse, or may be generalized to one or more retailers or locations of retailers. The machine learning model may be stored in the data store 240 of the online concierge system 140, or may be stored or hosted remotely for access by the online concierge system 140.

In some embodiments, the machine learning model is trained on training data describing comparative performance of static item displays and dynamic item displays over a prior time period. In some embodiments, the display selection module 250 may train the machine learning model by comparing performance data for a candidate interface including dynamic item displays and another candidate interface including default or static item displays. In some embodiments, the display selection module 250 may retrain the machine learning model, e.g., periodically responsive to new performance data being gathered, responsive to an administrator or other user of the online concierge system 140 submitting an instruction to retrain the machine learning model, etc.

Once trained, the display selection module 250 may use output from the machine learning model to determine when to replace default static item displays with dynamic item displays, and what type of dynamic item displays to present to users of the online concierge system 140.

Figure 3:
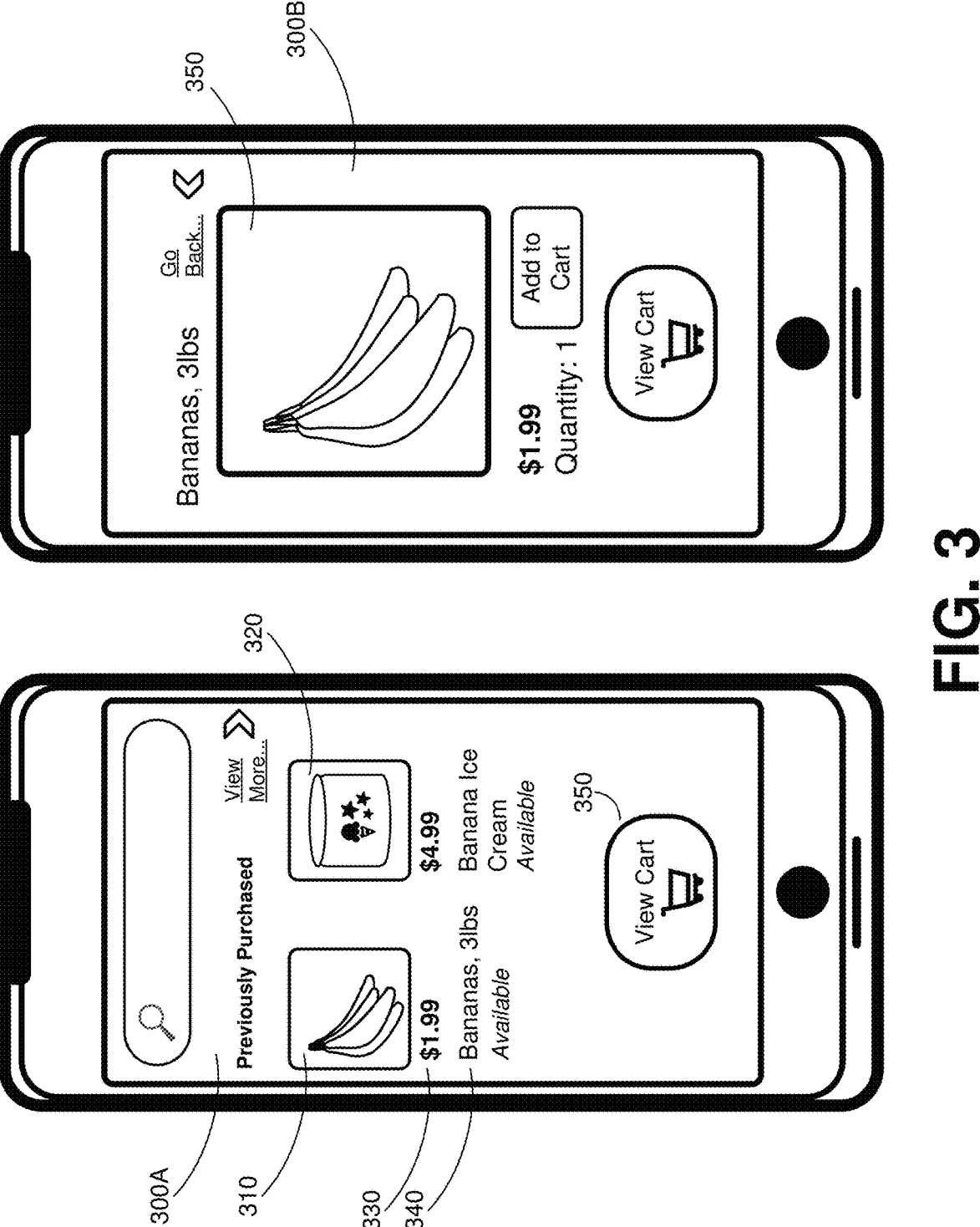
FIG. 3 includes example interfaces for an online concierge system with default static item displays, in accordance with one or more embodiments.

FIG. 3 includes example interfaces for an online concierge system 140 with default static item displays, in accordance with one or more embodiments. As previously noted, display content may appear in various interfaces of the online concierge system 140, including in interfaces not shown here, and may appear in different orientations or layouts than shown here.

A first interface 300A illustrates a simplified selection interface. The selection interface 300A may be a homepage or main interface of the online concierge system 140, or may be a search interface presented to users responsive to a search query being input to the online concierge system. In some embodiments, the selection interface 300A may be a carousel interface including one or more carousels, which are scrollable lists of items (e.g., matched items within a group represented by the carousel—as shown in FIG. 3, "Previously Purchased").

The selection interface 300A includes one or more items. Each item is represented by display content 310, 320 associated with the item. As shown here, the display content 310, 320 for the items are default static item displays, such that each item is represented by a static image representing the item. The items may additionally be associated with other information associated with the items and/or with actions that may be taken by a viewing user. For example, the selection interface 300A may identify a price 330 for each item, as well as a name 340 for the item. In other embodiments, the selection interface 300A may include other or additional information describing the items, such as a stock number, available deals, or the like. In another example, the selection interface 300A may include a search bar in which to input a new search query, a "View Cart" 350 icon to view items currently added to a user's cart, one or more scrollable carousels in which additional items may be viewed, etc.

A second interface 300B illustrates a simplified item page interface. The item page interface 300B may be displayed to users of the online concierge system 140 responsive to, for example, the user selecting an item from the selection interface 300A, selecting an item from a sidebar or header of the online concierge system 140, or the like. The item page interface 300B includes information describing the item, such as an item name ("Bananas, 3 lbs"), a price ("$1.99"), and display content 350 for the item. As shown in the example of FIG. 3, the display content 350 is a static item display, e.g., is a static image representing the item. The item page interface 300B may additionally include other elements, such as selectable elements for adding the item to a cart, viewing the cart, returning to a previous interface, navigating to a next item of a carousel, or the like.

Figure 4:
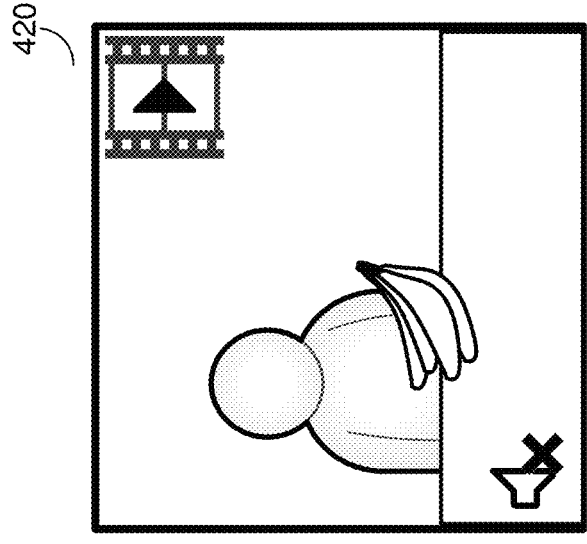
FIG. 4 is an example illustration of display content for an item of the online concierge system, in accordance with one or more embodiments.
Figure 4:
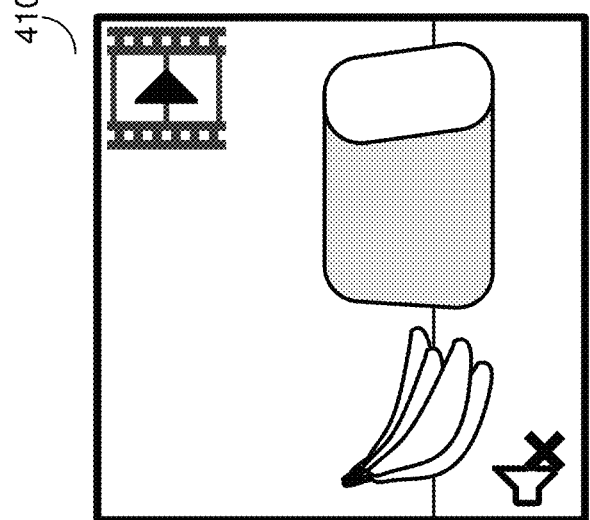
Figure 4:
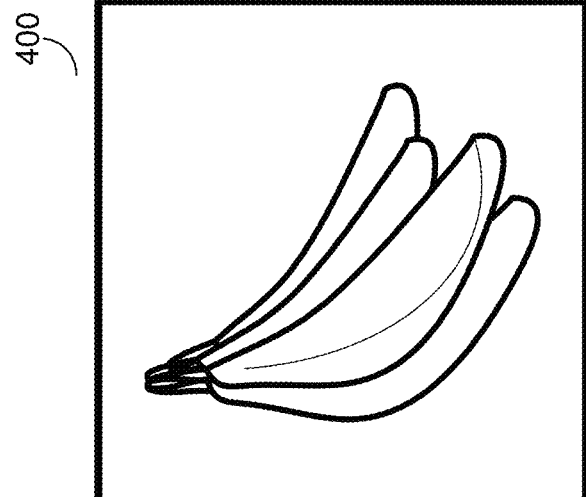

FIG. 4 is an example illustration of display content for an item of the online concierge system 140, in accordance with one or more embodiments. Display content for items of the online concierge system 140 may include one or more static item displays 400 and/or one or more dynamic item displays 410, 420; each of the static and/or dynamic item displays may have different characteristics or aspects that may be associated with more or less expected lift when presented to a given user of the online concierge system 140. Each of the item displays shown in FIG. 4 may be used to represent the same item (e.g., bananas) when presented to the user. In some embodiments, the static item displays and/or dynamic item displays are stored by the online concierge system 140 (e.g., in the data store 240). In other embodiments, the static item displays and/or dynamic item displays may be stored on one or more third-party servers (e.g., by a retailer associated with a given item) and may be retrieved by the online concierge system 140 for display.

In the example of FIG. 4, a static item display 400 is an image representation of an item on the online concierge system 140. In some embodiments, the static item display 400 may be a photograph of an item or an artistic rendering of the item, and may include other elements, such as items that may be commonly paired with the item (e.g., a photograph including a carton of milk behind a cereal box), colorful or eye-catching backgrounds, or the like.

In some embodiments, an item may be associated with more than one static item display, wherein a first static item display 400 is default display content for the item and one or more other static item displays have different characteristics or aspects that may influence the lift of the static item displays. For example, a default static item display 400 may have a photograph of an item on a plain background, while one or more other static item displays 400 may include other elements, e.g., other items, different backgrounds, text, or the like.

Items may also be associated with one or more dynamic item displays 410, 420. The one or more dynamic item displays 410, 420 may have different characteristics or aspects that may influence the lift of the dynamic item displays. For example, dynamic item displays may be video clips, gifs, or other dynamic forms of content, and may include audio content, text overlays, or the like. Further, dynamic item displays may be directed to different contexts for the item. In the example of FIG. 4, a first dynamic item display 410 may be a video clip illustrating a way to use an item; for example, the video clip may provide a recipe for the item (e.g., a recipe for banana bread made from the banana item), or may provide a contextual use for the item (e.g., a day outside hiking for a sports drink). The dynamic item display 410 may include audio instructions for making the recipe. A second dynamic item display 420 may be a video clip by a content creator promoting the item. The dynamic item display 420 may include audio dialogue by the content creator. Likewise, dynamic item displays may include one or more contexts, e.g., a content creator promoting an item by providing a recipe for the item, or may be directed towards other contexts not discussed here.

Each of the static and dynamic item displays may be associated with one or more characteristics and aspects identified by the online concierge system 140. The one or more characteristics and aspects of the item displays may make each item display more or less attractive to different users of the online concierge system; that is, the item displays may provide more or less benefit (as may be measured in expected lift) to different users. For example, the first dynamic item display 410 including a recipe for an item may be more beneficial to a user that did not previously know how to use the item (e.g., how to combine the item with other items in the user's cart), while the second dynamic item display 420 including a content creator promoting the item may provide more benefit to a user that has previously indicated an interest in that content creator.

Figure 5:
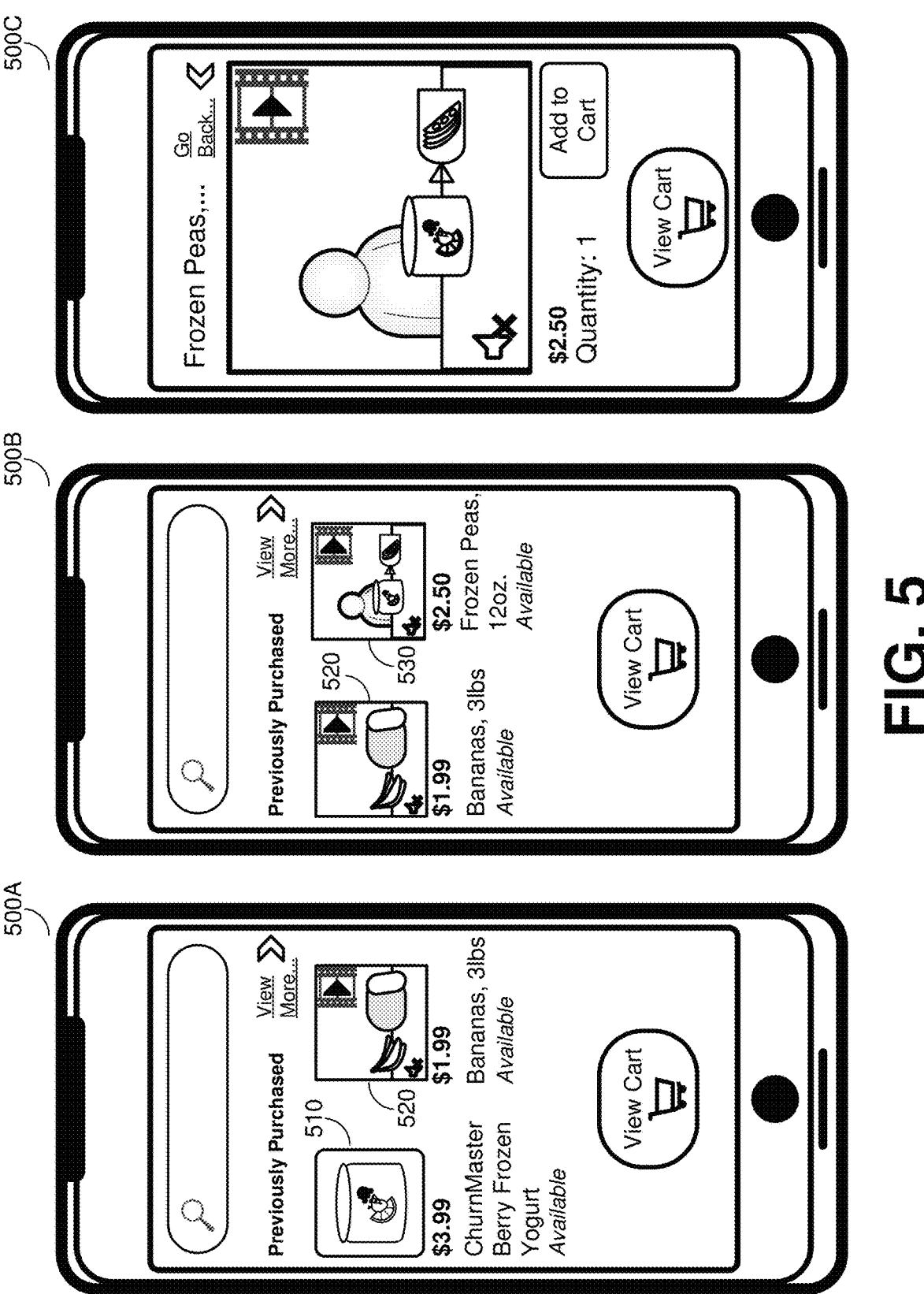
FIG. 5 are example interfaces for an online concierge system with one or more default static item displays replaced by dynamic item displays, in accordance with one or more embodiments.

FIG. 5 are example interfaces for an online concierge system 140 with one or more default static item displays replaced by dynamic item displays, in accordance with one or more embodiments. In the example of FIG. 5, selection interfaces 500A, 500B include one or more items represented by display content 510, 520, 530 associated with the items. As previously discussed in conjunction with FIG. 3, selection interfaces 500A, 500B may be a homepage or main interface, a search interface, and/or a carousel interface presenting one or more scrollable carousels. In the example of the first selection interface 500A, a first item is represented by a default static item display 510, while a second item is represented by a dynamic item display 520. Both visible items may also be associated with information describing the item, e.g., a price of the item, a name of the item, or other relevant information. In some embodiments, the dynamic item display 520 may be a video clip that automatically begins to play responsive to a user viewing the first interface 500A. In other embodiments, the dynamic item display 520 may be a video clip that begins to play responsive to a user interacting with the dynamic item display. In other embodiments, portions of the dynamic item display 520 may automatically play (e.g., a visual video component), while other portions may begin playing responsive to user interaction (e.g., an audio component).

In the example of the second selection interface 500B, both visible items are represented by dynamic item displays 520, 530. In other examples, fewer or additional items may be visible on the selection interface 500B simultaneously, and fewer or additional items may be represented by dynamic item displays, given that the total dynamic item displays do not exceed a threshold resource usage. In some embodiments, the threshold for acceptable resource usage may be determined by the online concierge system 140. In other embodiments, an acceptable resource usage may be determined by a client device or other intermediate device or server, and may be dictated by, for example, the resource requirements for storing dynamic item displays in memory for a user device, a total bandwidth available for the instance of the online concierge system 140, a total screen space available for items to be displayed on the client device, or other space or resource constraints.

In a third selection interface 500C, a single item is replaced with a dynamic item display. Rather than the static item display as shown in FIG. 3 in interface 300B, the dynamic item display in the third selection interface 500C may be shown instead, providing additional details for the user and encouraging interaction by the user. The use of a single item interface may reduce resource requirements relative to multiple items of user interfaces 500A-B. In one example, the dynamic item display for one item, as shown in selection interface 500C, may be used after a user selects the item in a carousel view (e.g., selects a static item display in the carousel).

As previously noted, display content including dynamic item displays may appear in various interfaces of the online concierge system 140, including in interfaces not shown here, and may appear in different orientations or layouts than shown here. Display content including dynamic item displays may be associated with different lift, represented as different display scores, based on placement in various interfaces or orientations of the online concierge system 140. For example, display content appearing in a selection interface, as in 500A, 500B, may be associated with lower lift than display content appearing in a single item display interface, as in 500C, wherein a user has already indicated interest in and interacted with an item (e.g., clicking in from a selection interface).

FIG. 6 is a flowchart for a method for selecting dynamic item displays to replace static item displays in a user interface, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

The online concierge system 140 identifies 605 a plurality of items for a user responsive to a search query by the user. Each item of the plurality of items may be associated with respective display content including a default static item display. One or more items of the plurality of items may be selected specifically for the user, e.g., based at least in part on a purchase history for the user, on preferences or characteristics of the user, on preferences or characteristics of the item(s), or the like. As described previously, the default static item display may be a static image representing the item, and the default static item display may be provided to a plurality of users on the online concierge system 140.

The online concierge system 140 determines 610 a display score for a dynamic item display associated with an item of the plurality of items. The display score describes an expected benefit or 'lift' of the dynamic item display relative to the default static item display associated with the item. The online concierge system 140 additionally determines 615 a bandwidth score for the dynamic display associated with the item of the plurality of items. The bandwidth score describes resource usage of the dynamic item display.

In some embodiments, the online concierge system 140 applies a trained machine learning model to determine one or more of the display score and/or the bandwidth score. The machine learning model is configured to receive a first set of input features describing the user and a second set of input features describing the dynamic item display. Input features describing the user may include, for example, geographic location of the user, items previously purchased by the user, demographic information of the user, content creators followed by the user, interests or hobbies associated with the user, and other features that may be suitable for predicting the user's benefit/lift related to the dynamic content item for a user. Input features describing the dynamic item display may comprise, for example, a type or file format of the dynamic item display, a video length of the dynamic item display, an audio length of the dynamic item display, a content type or focus of the dynamic item display, content creators associated with the dynamic item display, placement of the dynamic item display on the online concierge system 140, and other features suitable for predicting the benefit/lift related to the dynamic content item.

Based on the determined display score and bandwidth score, the online concierge system 140 selectively 620 replaces the default static item display with the dynamic item display as the display content for the item. In some embodiments, the online concierge system 140 replaces the default static item display with the dynamic item display based on the display score being higher than a threshold value for expected lift and the bandwidth score being lower than a threshold value for acceptable resource usage. In other embodiments, the online concierge system 140 replaces the default static item display with the dynamic item display based on other criteria. For example, the default static display item may be replaced with the dynamic item display responsive to the display score being higher than a threshold value for expected lift regardless of a bandwidth score, responsive to a display score to bandwidth score ratio, or alternative criteria.

In some embodiments, wherein multiple items of the plurality of items may have display content replaced by dynamic item displays, the online concierge system 140 may optimize selection of dynamic item displays for replacement. For example, the online concierge system 140 may determine one or more display scores and one or more bandwidth scores for one or more other dynamic item displays. The one or more other dynamic item displays may be associated with the same item or with one or more other items of the plurality of items for the user. The online concierge system 140 may compare the determined display score and/or bandwidth score for the dynamic item display to one or more other display scores and/or bandwidth scores for the other dynamic item displays. For example, the online concierge system 140 may select dynamic item displays to replace static item displays based on highest display scores first (e.g., based on a greedy algorithm), such that dynamic item displays with the highest display scores are selected until a corresponding bandwidth score total is reached. In another example, the online concierge system 140 may select dynamic item displays to replace static item displays based on a ratio of display score to bandwidth score, such that dynamic item displays with a greatest lift-to-bandwidth ratio are selected until a bandwidth score total is reached. In another example, the online concierge system 140 may select dynamic item displays to replace static item displays based on lowest bandwidth scores until a threshold bandwidth score is reached to prioritize a number of dynamic item displays viewed by the user. In other examples, the online concierge system 140 may select dynamic item displays to replace static item displays based on one or more other criteria.

The online concierge system 140 sends 625 the plurality of items and respective display content for display to the user on a client device, which may, e.g., cause the client device to display the plurality of items and respective display content.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example;

comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed by a system comprising one or more processors, comprising:

Identifying, by the one or more processors, a plurality of items for a user responsive to a search query, wherein each of the plurality of items is associated with respective display content including a default static item display;

applying, by the one or more processors, a machine learning model to a dynamic item display associated with an item of the plurality of items, the machine learning model receiving a first set of input features describing the user and a second set of input features describing the dynamic item display and generating a display score describing a lift of the dynamic item display relative to the default static item display associated with the item;

generating, by the one or more processors, a bandwidth score for the dynamic item display, the bandwidth score describing resource usage of the dynamic item display;

based on the generated display score and the bandwidth score, selectively replacing, by the one or more processors, the default static item display with the dynamic item display as the display content for the item; and sending, by the one or more processors, the plurality of items and respective display content for display to the user on a client device, wherein the sending causes the client device to display the display content with the dynamic item display.

2. The method of claim 1, wherein applying the machine learning model to the dynamic item display comprises retrieving information describing one or more of: locations associated with the dynamic item display, a duration of the dynamic item display, or content creators associated with the dynamic item display.

3. The method of claim 1, wherein receiving the first set of input features describing the user comprises receiving one or more of: a geographic location of the user, items previously purchased by the user, items previously purchased by other users having a similar geographic location to the user, demographic information of the user, or content creators or interests associated with the user.

4. The method of claim 1, wherein the selectively replacing the default static item display with the dynamic item display as the display content for the item comprises:

generating another bandwidth score for another dynamic item display associated with another item of the plurality of items;

identifying that the bandwidth score for the dynamic item display and the other bandwidth score for the other dynamic item display do not exceed a threshold bandwidth; and replacing the default static item display with the dynamic item display as the display content for the item and replacing another static item display with the other dynamic item display for the other item.

5. The method of claim 1, wherein the selectively replacing the default static item display with the dynamic item display as the display content for the item comprises:

identifying a set of dynamic item displays associated with one or more items of the plurality of items, the set of dynamic item displays including the dynamic item display and the plurality of items including the item;

applying the machine learning model to generate display scores for each of the set of dynamic item displays;

generating bandwidth scores for each of the set of dynamic item displays; and based on the generated display scores and bandwidth scores, selecting at least the dynamic item display to replace the default static item display as the display content for the item.

6. The method of claim 1, wherein the selectively replacing the default static item display with the dynamic item display as the display content for the item comprises:

identifying a set of dynamic item displays associated with the item, the set of dynamic item displays including the dynamic item display;

applying the machine learning model to generate display scores for each of the set of dynamic item displays associated with the item;

generating bandwidth scores for each of the set of dynamic item displays associated with the item; and based on the generated display scores and bandwidth scores, selecting the dynamic item display to replace the default static item display as the display content for the item.

7. The method of claim 1, wherein the selectively replacing the default static item display with the dynamic item display as the display content for the item comprises selecting the dynamic item display based on having a display score above a first threshold value and a bandwidth score below a second threshold value.

8. The method of claim 1, wherein the selectively replacing the default static item display with the dynamic item display as the display content for the item comprises selecting the dynamic item display based on having a higher ratio of display score to bandwidth score than one or more other dynamic item displays and a bandwidth score beneath a threshold value.

9. The method of claim 1, wherein the selecting selectively replacing the default static item display with the dynamic item display as the display content for the item comprises determining a display/bandwidth ratio based on the display score and bandwidth score.

10. The method of claim 1, wherein the machine learning model is trained on training data describing comparative performance of static item displays and dynamic item displays over a prior time period.

11. The method of claim 1, wherein the lift of the dynamic item display is generated based on an expected difference in user interaction when presented with the dynamic item display relative to the default static item display.

12. A computer program product comprising a non-transitory computer-readable storage medium having instructions encoded thereon that, when executed by a processor, cause the processor to perform steps comprising:

identifying a plurality of items for a user responsive to a search query, wherein each of the plurality of items is associated with respective display content including a default static item display;

applying a machine learning model to a dynamic item display associated with an item of the plurality of items, the machine learning model receiving a first set of input features describing the user and a second set of input features describing the dynamic item display and generating a display score describing a lift of the dynamic item display relative to the default static item display associated with the item;

generating a bandwidth score for the dynamic item display, the bandwidth score describing resource usage of the dynamic item display;

based on the generated display score and the bandwidth score, selectively replacing the default static item display with the dynamic item display as the display content for the item; and sending the plurality of items and respective display content for display to the user on a client device, wherein the sending causes the client device to display the display content with the dynamic item display.

13. The computer program product of claim 12, wherein applying the machine learning model to the dynamic item display comprises retrieving information describing one or more of: locations associated with the dynamic item display, a duration of the dynamic item display, or content creators associated with the dynamic item display.

14. The computer program product of claim 12, wherein receiving the first set of input features describing the user comprises receiving one or more of: a geographic location of the user, items previously purchased by the user, items previously purchased by other users having a similar geographic location to the user, demographic information of the user, or content creators or interests associated with the user.

15. The computer program product of claim 12, wherein the selectively replacing the default static item display with the dynamic item display as the display content for the item comprises:

generating another bandwidth score for another dynamic item display associated with another item of the plurality of items;

identifying that the bandwidth score for the dynamic item display and the other bandwidth score for the other dynamic item display do not exceed a threshold bandwidth; and replacing the default static item display with the dynamic item display as the display content for the item and replacing another static item display with the other dynamic item display for the other item.

16. The computer program product of claim 12, wherein the selectively replacing the default static item display with the dynamic item display as the display content for the item comprises:

identifying a set of dynamic item displays associated with one or more items of the plurality of items, the set of dynamic item displays including the dynamic item display and the plurality of items including the item;

applying the machine learning model to generate display scores for each of the set of dynamic item displays;

generating bandwidth scores for each of the set of dynamic item displays; and based on the generated display scores and bandwidth scores, selecting at least the dynamic item display to replace the default static item display as the display content for the item.

17. The computer program product of claim 12, wherein the selectively replacing the default static item display with the dynamic item display as the display content for the item comprises:

identifying a set of dynamic item displays associated with the item, the set of dynamic item displays including the dynamic item display;

applying the machine learning model to generate display scores for each of the set of dynamic item displays associated with the item;

generating bandwidth scores for each of the set of dynamic item displays associated with the item; and based on the generated display scores and bandwidth scores, selecting the dynamic item display to replace the default static item display as the display content for the item.

18. The computer program product of claim 12, wherein the selectively replacing the default static item display with the dynamic item display as the display content for the item comprises selecting the dynamic item display based on having a display score above a first threshold value and a bandwidth score below a second threshold value.

19. The computer program product of claim 12, wherein the machine learning model is trained on training data describing comparative performance of static item displays and dynamic item displays over a prior time period.

20. A computer system comprising:

one or more processors; and a non-transitory computer-readable storage medium storing instructions executable by the one or more processors for performing steps including:

identifying a plurality of items for a user responsive to a search query, wherein each of the plurality of items is associated with respective display content including a default static item display;

applying a machine learning model to a dynamic item display associated with an item of the plurality of items, the machine learning model receiving a first set of input features describing the user and a second set of input features describing the dynamic item display and generating a display score describing a lift of the dynamic item display relative to the default static item display associated with the item;

generating a bandwidth score for the dynamic item display, the bandwidth score describing resource usage of the dynamic item display;

based on the generated display score and the bandwidth score, selectively replacing the default static item display with the dynamic item display as the display content for the item; and sending the plurality of items and respective display content for display to the user on a client device, wherein the sending causes the client device to display the display content with the dynamic item display.

* * * * *